(12) United States Patent
Wang et al.

(10) Patent No.: US 7,573,964 B2
(45) Date of Patent: Aug. 11, 2009

(54) CHANNEL ESTIMATOR WITH EXTENDED CHANNEL BANDWIDTH

(75) Inventors: Michael M. Wang, San Diego, CA (US);
Rajeev Agrawal, Northbrook, IL (US);
Xiangyang Chen, Lake Zurich, IL (US);
Ajoy K. Singh, Round Lake, IL (US);
Tyler A. Brown, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 661 days.

(21) Appl. No.: 11/014,617

(22) Filed: Dec. 16, 2004

(65) Prior Publication Data

US 2006/0133457 A1    Jun. 22, 2006

(51) Int. Cl.
*H04B 1/10* (2006.01)

(52) U.S. Cl. .................................... 375/350; 455/188.1

(58) Field of Classification Search ......... 375/147–148, 375/240, 316, 324–326, 330, 340, 346, 35; 455/188.1

See application file for complete search history.

(56) References Cited

U.S. PATENT DOCUMENTS

| 5,694,414 | A | 12/1997 | Smith et al. |
|---|---|---|---|
| 6,584,304 | B1 | 6/2003 | Thomsen et al. |
| 6,760,362 | B2 * | 7/2004 | Patel et al. .................. 375/147 |
| 7,230,975 | B2 * | 6/2007 | Subrahmanya et al. ...... 375/148 |
| 2002/0044593 | A1 | 4/2002 | Kuo |
| 2002/0167913 | A1 | 11/2002 | Leung |
| 2002/0172307 | A1 | 11/2002 | Sandberg |
| 2002/0181553 | A1 | 12/2002 | Mallett et al. |
| 2003/0087622 | A1 | 5/2003 | Jayaraman et al. |
| 2005/0085203 | A1 | 4/2005 | Suganuma |

* cited by examiner

*Primary Examiner*—Chieh M. Fan
*Assistant Examiner*—Freshteh N Aghdam (57) ABSTRACT

A method (1700) and apparatus (1801) provide channel estimation with extended bandwidth filters. Antenna (1813) receives a signal such as a pilot signal and detects a bandwidth associated with the pilot signal in a detector (320). One of a plurality of filters (603, 605, 607, and 609) including extended bandwidth filters (311) and a default filter (305) can be selected by a selector (617). If the detector detects activity associated with a wider bandwidth, the filter associated with the wider bandwidth is selected over the presently selected filter. If no activity is detected, the default filter is selected.

12 Claims, 7 Drawing Sheets

CHANNEL ESTIMATOR WITH EXTENDED CHANNEL BANDWIDTH

FIELD OF THE INVENTION

The present invention relates in general to wireless communication systems, and more specifically to a method and apparatus for channel estimation in a wireless cellular communication system.

BACKGROUND OF THE INVENTION

Channel estimation in conventional Code Division Multiple Access (CDMA) base receivers, such as base receivers within Radio Access Networks (RANs) designed in accordance with 3 Generation (3G) standards such as CDMA 2000 or Interim Standard 2000 (IS2000), Universal Mobile Telecommunication System (UMTS), and the like, is usually performed using a low-pass filter with a fixed bandwidth to establish and maintain communication with a communication unit such as cellular communication unit moving with a user within a mobile platform such as a vehicle traveling at various speeds within the RAN. To perform channel estimation, a bandwidth of, for example, 250 Hz can be used and is generally effective for most normal ambulatory or vehicular speeds.

Channel estimation fails however when the communication unit travels at high speeds. For example when a communication unit is attempting to establish or maintain a link while within a high speed vehicle such as a bullet train, where speeds of as much as around 450 km/h can be reached, the performance degradation can exceed 1 dB for a 2 GHz carrier frequency. In order to address channel estimation associated with communications while traveling at high speeds, the channel estimation bandwidth must be extended. Simply replacing the conventional 250 Hz bandwidth channel estimation filter with a channel estimation filter having an extended bandwidth however, results in a significant performance degradation at normal speed ranges.

Other proposed solutions to extending the bandwidth of the channel estimation filter include the use of adaptive filtering. In some simple adaptive channel estimation procedures, channel estimation filter coefficients may be adjusted according to an estimated speed based on, for example, Doppler estimation, however disadvantages exist in such approaches. By changing filter coefficients, undesirable transient effects are introduced which can disrupt estimation. Moreover, systems using Doppler estimation and other methods have additional disadvantages in that they are undesirably high in complexity.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

In overview, the present invention relates to receivers in wireless communication systems for facilitating cellular communication between devices or units, often referred to as communication units, such as cellular telephone or two-way radio handsets and infrastructure components such as base stations and the like. More particularly, various inventive concepts and principles are embodied in receivers associated with cellular communication units and related communication systems, infrastructure components, communication devices, and methods therein for performing channel estimation. It should be noted that in addition to connoting a typical handset, the term communication unit may be used interchangeably with mobile station, subscriber unit, wireless subscriber unit, wireless subscriber device or the like.

Each of these terms denotes a device ordinarily associated with a user and typically a wireless mobile device that may be used with a public network or within a private network such as an enterprise network. Examples of such units include personal digital assistants, personal assignment pads, and other portable personal computers equipped for wireless operation, a cellular handset or device, or equivalents thereof provided such units are arranged and constructed for executing application programs requiring an input signal for menu navigation or the like. The term base station connotes a base station transceiver, a Node B transceiver, or the like as will be appreciated by one of ordinary skill in the art and more particularly to a receiver associated therewith for receiving communications over, for example, a Radio Frequency (RF) interface.

The present description is provided to further explain, in an enabling fashion, exemplary modes of performing one or more embodiments of the present invention. The description is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by various exemplary embodiments.

In addition to devices of a general nature, the communication devices of particular interest are those providing or facilitating voice/data communications services over cellular wide area networks (WANs), such as conventional two way systems and devices, various cellular phone systems including, CDMA (code division multiple access) systems and variants thereof, 2.5G and 3G systems such as UMTS (Universal Mobile Telecommunication Service) systems and variants or evolutions thereof. Furthermore the wireless communication units or devices of interest can have short range wireless communications capability normally referred to as WLAN capabilities, such as IEEE 802.11, Bluetooth, or Hiper-Lan and the like using various access technologies and one or more of various networking protocols.

Figure 1:
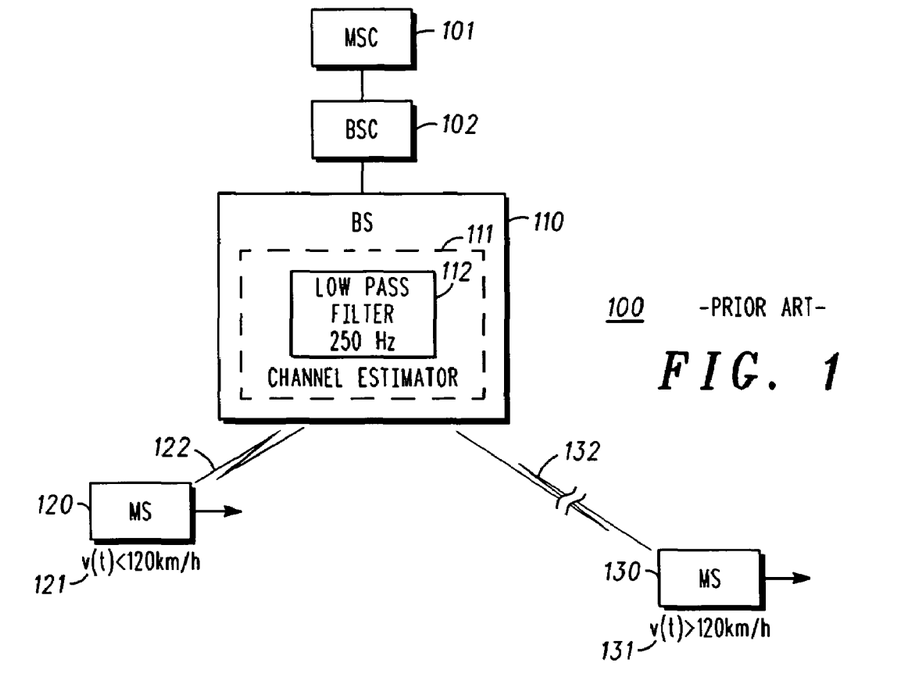
FIG. 1 is a diagram illustrating an exemplary RAN environment and a mobile station with prior art channel estimation.

As further discussed herein below, various inventive principles and combinations thereof are advantageously employed to provide channel estimation which, unlike a conventional estimation environment 100, as shown, for example, in FIG. 1, can provide channel estimation for mobile communication units including stationary units and units traveling at a variety of speeds including speeds upwards of 450 km/h. In the conventional estimation environment 100, a Mobile Switching Center (MSC) 101 can be coupled to a Base Station Controller (BSC) 102, which is coupled to Base Station (BS) 110 having a channel estimator 111 typically located in a transceiver (not shown), or coupled to a receiver section thereof. As noted above, the channel estimator 111 includes a low-pass filter 112 with a fixed bandwidth of 250 Hz. When a mobile station (MS) 120, traveling at relative mobility speed 121, for example under 120 km/h, attempts to communicate with BS 110, a link 122 can be successfully estimated and thus established and maintained by channel estimator 111. When a MS 130, traveling at relative mobility speed 131, for example over 120 km/h, link 132 often cannot be successfully estimated and thus not established or maintained by channel estimator 111.

It should be noted that, by relative mobility speed, reference is made to the relative difference in velocity between, for example, BS 110 and MS 120 or MS 130. The resulting performance degradation for MS 130 and link 132 is around 1.5 dB for a 450 km/h relative mobility speed and a 2 GHz carrier frequency. As noted, extending the bandwidth of low pass filter 112 to 800 Hz also results in a significant performance degradation of around 1 dB for MS 120 operating at normal relative mobility speed ranges.

Adaptive channel estimators adjust channel estimation filter coefficients according to the estimated Doppler speed. However, as noted, changing filter coefficients introduces transient effects. Moreover, Doppler estimation and other channel estimators such as model-based Kalman filtering as described for example in a document entitled "Linear multiuser detection in time varying multipath fading channels", M. Stojanovic, Z. Zvonar, Proc. 1996 Conf. Information Sciences and Systems, Princeton, N.J., March 1996, pp. 349-354, and Least Mean Squares channel estimation as described in "Performance of Multiuser Detection with Adaptive Channel Estimation,", M. Stojanovic, Z. Zvonar, IEEE Trans. Commun. Vol. 47, pp. 1129-1132, August 1999, are undesirable in that they usually require high complexity in their respective implementations.

Figure 2:
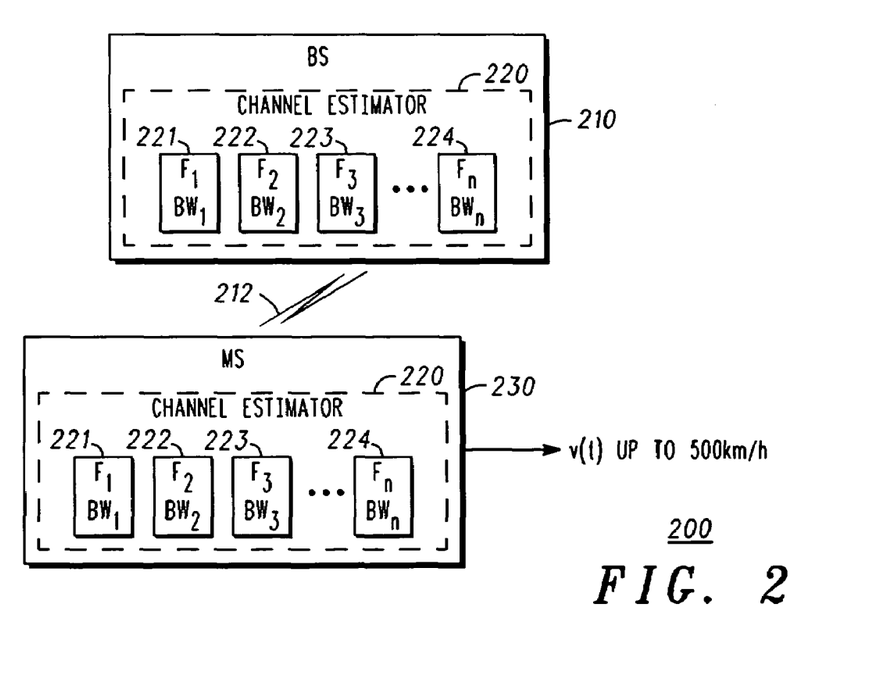
FIG. 2 is a diagram illustrating a simplified and representative exemplary channel estimator in a base station and a mobile station having multiple bandwidth elements in accordance with various exemplary embodiments.

Thus in accordance with various exemplary embodiments, the channel estimator of the present invention has minimal or no transient effects and only a minimal increase in complexity. As shown in configuration 200 of FIG. 2, a channel estimator 220 can be implemented in either or both of BS 210 and MS 230 for increasing the flexibility of the receivers. The channel estimator 220 can be provided with multiple channel estimation filters $F_1$ 221, $F_2$ 222, $F_3$ 223, and $F_n$ 224 each having a different bandwidth $BW_1$, $BW_2$, $BW_3$, and $BW_n$ and operating concurrently. It will be appreciated that in accordance with various exemplary embodiments, the configuration 200 shown in FIG. 2 allows relative speeds between, for example, BS 210 and MS 230 to reach upwards of 500 km/h depending on a variety of external factors known to those of ordinary skill in the art which affect the radio transmission environment. As can be seen, channel 212 between BS 210 and MS 230 can be estimated and thus established and maintained at such speeds in contrast with conventional channel estimators as described hereinabove.

Figure 3:
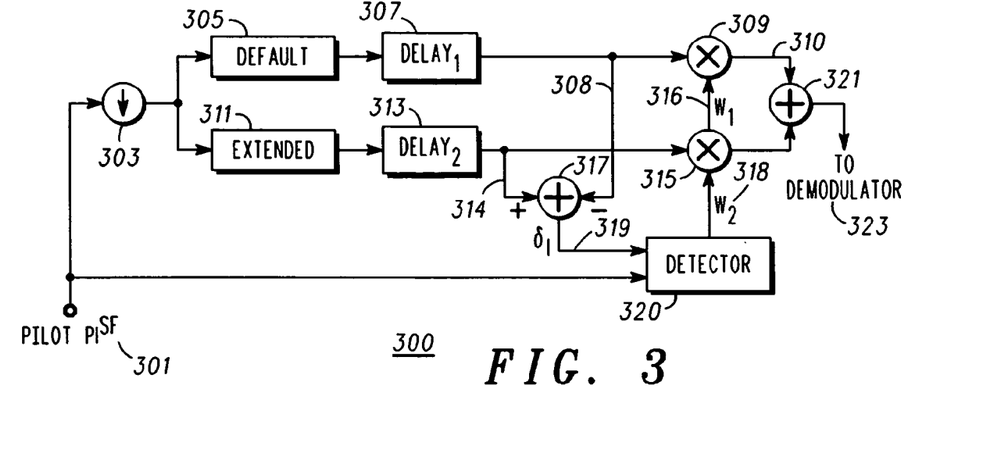
FIG. 3 is a diagram illustrating exemplary modules in a basic channel estimator in accordance with various exemplary embodiments.

In accordance with various exemplary embodiments, a basic channel estimator configuration 300 is shown in FIG. 3. In accordance with conventional air interface transmission protocols, such as CDMA protocols known to those of ordinary skill in the art a pilot symbol $P_1^{SF}$ 301 is input to a down sampler 303 and a channel activity detector 320. FIG. 3 further shows a default filter 305 and an extended bandwidth filter 311. The channel activity detector 320 is used to detect channel activity and select the most appropriate one of default filter 305 and extended bandwidth filter 311 for the current channel condition for channel estimation. In general, the output of default filter 305 and an extended bandwidth filter 311 are weighted and soft combined to generate the composite estimate. The channel activity detector 320 may further determine weights $W_1$ 316 and $W_2$ 318 and, in the simplest case, these weights can be either 1 or 0. The selected one of default filter 305 and an extended bandwidth filter 311 is given weight 1 and the unselected filter is given a weight of 0. Weights $W_1$ 316 and $W_2$ 318 can be applied to multipliers 309 and 315 and multiplied with the time adjusted output of default filter 305 and an extended bandwidth filter 311 whereupon the weighted outputs can be combined in summer 321 and coupled as output 323 to, for example, a demodulator. It will be appreciated that for the purpose of preserving generality, the simple case will be used herein for illustrative purposes in the rest of the discussion.

Delay elements DELAY 1 307 and DELAY 2 313 are used to generate timing adjustments between the channel estimates and the delays introduced by default filter 305 and extended bandwidth filter 311 and can be input to summer 317 to generate a signal $\delta_1$ 319 which can be input to channel activity detector 320. It should be noted that default filter 305 and extended bandwidth filter 311 can be either Finite Impulse Response (FIR) or Infinite Impulse Response (IIR) filters. If default filter 305 and extended bandwidth filter 311 are designed to have the same delay allowed by the system, such as, for example, 1 ms, Delay elements DELAY 1 307 and DELAY 2 313 can be removed. As noted, the outputs of default filter 305 and extended bandwidth filter 311, after timing adjustment if necessary, are differenced in summer 317 and input to channel activity detector 320.

Figure 4:
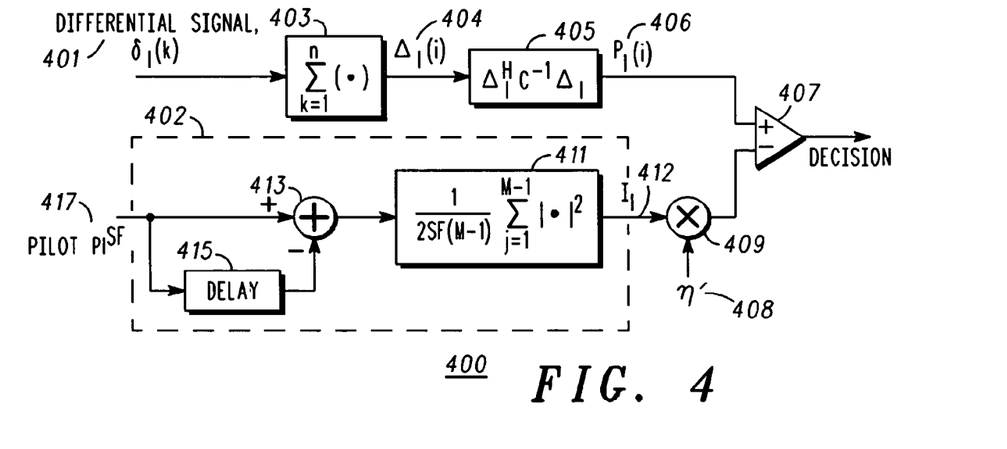
FIG. 4 is a diagram illustrating an exemplary channel activity detector in accordance with various exemplary embodiments.

As can be seen from FIG. 4, an exemplary channel activity detector 400, such as channel activity detector 320 in accordance with various exemplary embodiments, can consist of a differential signal power estimator including for example, an accumulator 403 providing an output 404 to a covariance normalizer 405 providing an output $P_1(i)$ 406 and an external baseline noise variance estimator 402 including, for example, summer 413, delay generator 415, and estimator 411 driving a scaling multiplier 409 at 412. Accordingly, differential signal $\delta_1(k)$ 401 is first coherently accumulated in accumulator 403 over a certain period if the sampling rate is much higher than the maximum channel fading speed in accordance with Equation (1):

$$\Delta_l(i) = \sum_{k=1}^{n} \delta_l(k) \quad (1)$$

Let $$\Delta^l = [\Delta_1^l \ \Delta_2^l \ \ldots \ \Delta_N^l] \quad (2)$$

where $\Delta^l$ is distributed as $N(0, R_0)$. It will also be appreciated that the relation between the accumulated differential signal and the fading signal is given in accordance with Equation (3):

$$f_{\Delta_l|H_0}(\Delta_l) = \pi^{-N}|R_0|^{-1}\exp\left\{-\frac{1}{2}\Delta_l^H R_0^{-1}\Delta_l\right\} \quad (3)$$

when the fading signal is not present ($H_0$); and where $\Delta^l$ is distributed as $N(0,R_1)$ is given in accordance with Equation (4):

$$f_{\Delta_l|H_l}(\Delta_l) = \pi^{-N}|R_1|^{-1}\exp\left\{-\frac{1}{2}\Delta_l^H R_1^{-1}\Delta_l\right\} \quad (4)$$

when the fading signal is present ($H_1$).

A log-likelihood ratio detector can be formed in accordance with Equation (5):

$$\Delta_l^H (R_0^{-1} - R_1^{-1})\Delta_l = \frac{1}{1+\sigma_0^2/\sigma_s^2} \Delta_l^H C^{-1}\Delta_l \lessgtr \eta \quad (5)$$

where $\sigma_0^2$ is the noise variance, $\sigma_s^2$ is the fading signal variance, C is the normalized covariance matrix also referred to as the correlation coefficient matrix $C = \sigma_0^{-2} R_0 = (\sigma_0^2 + \sigma_s^2)^{-1} R_1$, which is determined by the two filters, and $\eta$ is the detection threshold which is determined by the maximum false alarm probability allowed, that is, the largest false alarm probability that does not cause significant performance loss, such as a BER performance loss less than 0.1 dB. It should be noted that $\eta$ is a function of $\sigma_0^2$ and therefore cannot readily be pre-determined. Accordingly Equation (5) can be rewritten in accordance with Equation (6):

$$\frac{\Delta_l^H}{\sigma_0} C^{-1} \frac{\Delta_l}{\sigma_0} \lessgtr (\sigma_0^{-2} + \sigma_s^{-2})\eta = \eta' \quad (6)$$

Since $$\frac{\Delta_l}{\sigma_0}$$

is distributed as $N(0,C)$, the new detection threshold corresponding to $\eta'$ 408 is a constant independent of $\sigma_0^2$ and can thus be pre-determined. The detector can then be described in accordance with Equation (7) (where upper input to comparator 407 is left hand side and lower input is right hand side):

$$\Delta_l^H C^{-1} \Delta_l \lessgtr \sigma_0^2 \eta' \quad (7)$$

Figure 5:
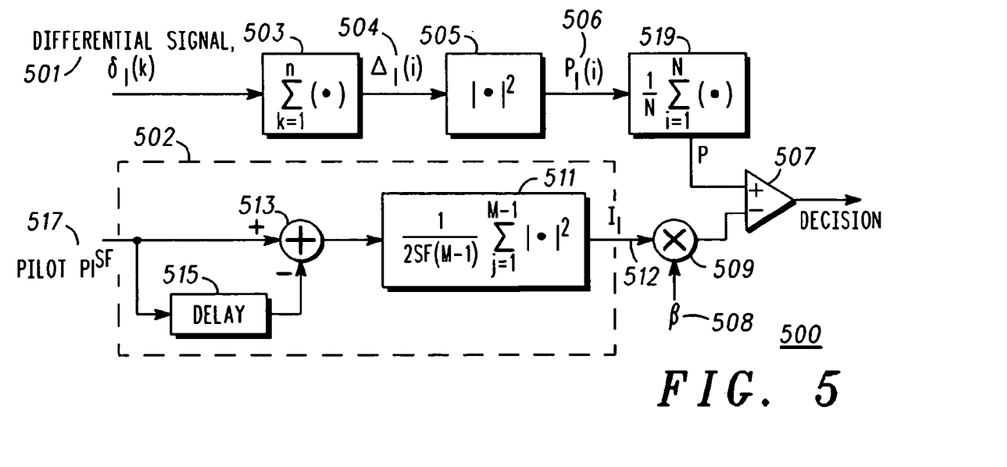
FIG. 5 is a diagram illustrating an exemplary channel activity detector having an independent channel bandwidth in accordance with various exemplary embodiments.

To estimate the noise variance for a signal containing a fading signal, a differential noise variance estimator may be used in the channel activity detector as shown in FIG. 5. Configuration 500 can consist of differential signal power estimator including for example, an accumulator 503 providing an output 504, squared error calculator 505 providing an output $P_1(i)$ 506, and summer block 519. Configuration 500 can also include an external baseline noise variance estimator 502 including, for example, summer 513, delay generator 515, and estimator 511 driving a scaling multiplier 509 at 512. The estimator 511 can be defined in accordance with Equation (8):

$$\sigma_{0,l}^2 = \frac{1}{2SF(M-1)} \sum_{j=1}^{M-1} |p_l^{SF}(j) - p_l^{SF}(j-1)|^2 \quad (8)$$

where $p_l^{SF}$ is the pilot symbol 517 of the lth finger of L fingers with despreading factor of SF. It will be appreciated that Equation (8) can also be used to define estimator 411 of FIG. 4, where $p_l^{SF}$ is the pilot symbol 417 of the lth finger with despreading factor of SF.

It should be noted that a higher sampling rate of the pilot symbol corresponding, for example, to a smaller SF, leads to better accuracy of the estimate of the noise variance. To obtain the best estimate of noise variance, pilot symbol 417 and 517 used for noise estimation should be sampled at highest possible rate or the shortest possible SF. It should also be noted that the noise variance estimator can be an "external" component and can be shared with other components in the system where noise variance information is needed.

Since P is $\chi^2$ distributed with mean and standard deviation $\propto I$, the decision rule which can be generated at comparator 507 can be described as: select the extended bandwidth filter if $$P > \frac{\beta}{\sqrt{L}} I$$

where $\beta$ is a scaling factor that is determined by the Neyman-Pearson criteria and L is the number of fingers in a rake receiver, otherwise select the default filter. Note that in an analogous manner the decision rule for comparator 407 ($P_l(i)$) is given by Eq. 7 above.

To better appreciate the difference between operation of configuration 400 in FIG. 4, and configuration 500 in FIG. 5, it should be noted that in configuration 400 the decision generated in comparator 407 can rest on the decision statistic such as $P_l(i)$ 406 based on combined fingers such that after detection, all the fingers use the same bandwidth. Configuration 400 yields acceptable performance if the fingers have the same channel bandwidth. An alternative is to allow different fingers to select different channel filter bandwidth independently as shown in configuration 500. The disadvantage of configuration 500 is that the decision statistic P may not always be as reliable as the combined statistic. On the other hand each finger can have different channel bandwidths.

Figure 6:
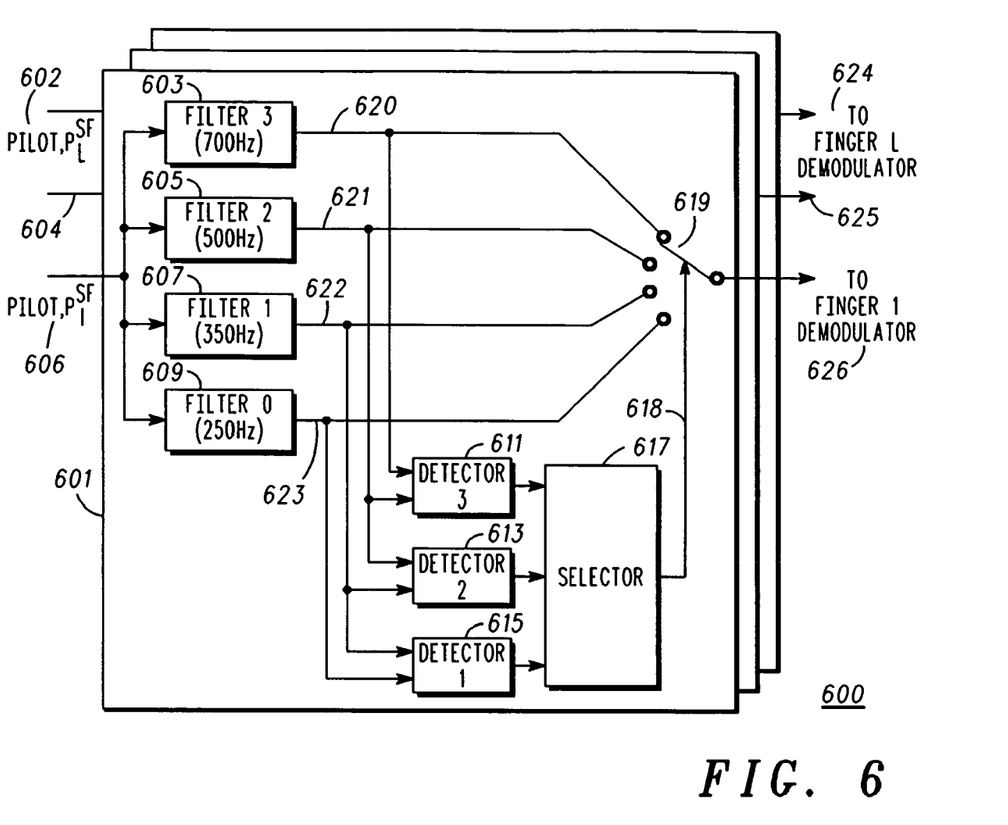
FIG. 6 is a diagram illustrating an exemplary channel estimator having extended filters in accordance with various exemplary embodiments.

Thus in accordance with various exemplary embodiments, to cover the entire channel bandwidth up to 900 Hz, configuration 600 is shown in FIG. 6 wherein it may be desirable to include more channel estimator modules with narrower frequency spacing to achieve the best performance. Configuration 600 is an exemplary estimator that covers channel bandwidths up to 900 Hz with non-linearly spaced cutoff frequencies. It should be noted that the narrower the spacing, the better the performance at the expense of more complexity. Thus the exemplary "smart" channel estimator of configuration 600 in FIG. 6 is comprised a structure or function 601 further comprised of concurrent low-pass filters FILTER 0 609 at 250 Hz, FILTER 1 607 at 350 Hz, FILTER 2 605 at 500 Hz, and FILTER 3 603 at 700 Hz with each coupled to a pilot signal, for example pilot signal 606, for the corresponding finger and providing respective outputs 623, 622, 621, 620. The smart channel estimator further includes three detectors DETECTOR 1 615 coupled to filter outputs 622, 623, DETECTOR 2 613 coupled to filter outputs 621, 622, and DETECTOR 3, 611 coupled to filter outputs 620, 621. A selector 617 selects one of FILTER 0 609-FILTER 3 603 by operation via control 618 of, for example, selector switch 619 if the corresponding one of DETECTOR 1 615, DETECTOR 2 613, or DETECTOR 3, 611 detects signal energy in the corresponding band with the resultant filter output signal further coupled to a corresponding finger demodulator 626. Note that the structure or function 601 can be repeated or duplicated for each finger in a known rake receiver where other pilot signals, for example pilot signals 604, 602 are coupled to duplicate structures with output from these duplicated structures or functions coupled to corresponding finger demodulators 625, 624. For multiple detections, the largest bandwidth filter should be selected. If none of DETECTOR 1 615, DETECTOR 2 613, or DETECTOR 3, 611 detects signal energy in the corresponding band, the default filter, such as FILTER 0 609 should be selected. It should be noted that to improve channel estimation performance at low relative speeds, a narrower filter such as a 170 Hz bandwidth filter can also be added to the smart channel estimator as described above at possibly an additional cost.

Performance of the proposed smart channel estimator with default filter, FILTER 0 609, and three extended filters, FILTER 1 607 at 350 Hz, FILTER 2 605 at 500 Hz, and FILTER 3 603 at 700 Hz, as shown in FIG. 6, was simulated by applicants on, for example, an IS2000 reverse link simulator for fundamental channel at various speeds, Doppler spreads, and number of multipaths as illustrated in the graphs shown in FIG. 7-FIG. 16. In accordance with the above noted simulation, the following exemplary parameters were used. The pilot strength was −6.5 dB relative to traffic, the coherent accumulating period n used in the simulation corresponded to ⅙ Power Control Group (PCG) and the non-coherent averaging period N corresponded to 20 ms. The accumulating period M for noise variance estimate was also 20 ms with a sampling rate of 76.8 kHz (SF=16). In the estimator, Butterworth Infinite Impulse Response (IIR) filters were used with a sampling rate of 19.2 kHz and approximately 1 ms delay. Results are shown for the Smart Channel Estimator, shown on the graph legends as SCE, as compared with fixed bandwidth channel estimators of the noted bandwidths, such as 250 Hz, 350 Hz, 490 Hz, and 690 Hz. It can easily be seen from the graphs that SCE was able to select the most appropriate filter for channel estimation according to different channel conditions.

As described above, conventional estimators such as the velocity controlled channel estimator consists of a conventional single low-pass filter, the coefficients of which are adjusted according to the relative speed. The conventional methods, and the velocity controlled methods in particular suffers from drawbacks in that, first, the change of filter coefficients causes a transient effect, causing the filter to require a certain amount of settling time to change from one set of coefficients to another; and second, the velocity estimation is complicated and usually inaccurate. In stark contrast, use of concurrently running filters in an exemplary SCE eliminates the transient effect and no explicit velocity estimation is needed. As shown by the simulation results illustrated in FIG. 7-FIG. 16, the proposed channel activity detector is able to dynamically select the most appropriate filter for channel estimation according to the changing channel conditions.

Figure 7:
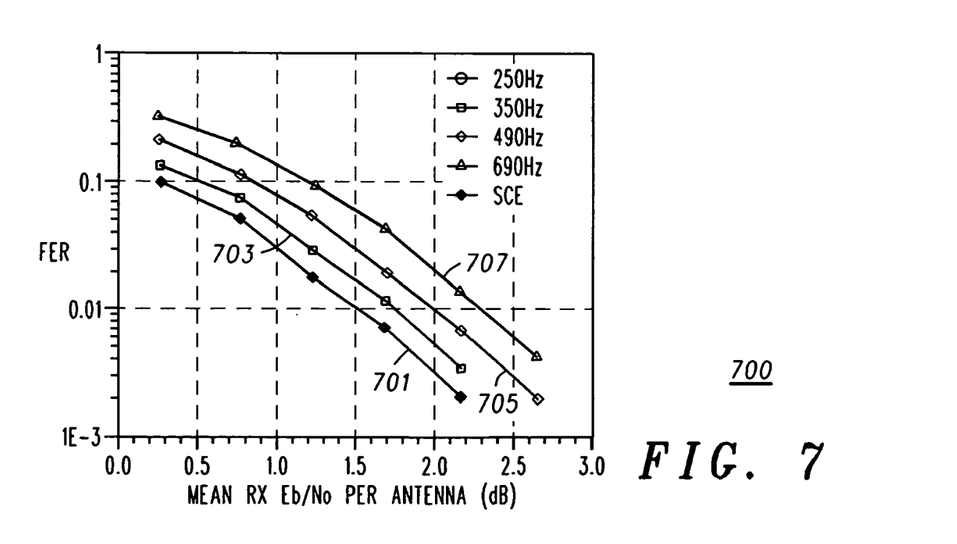
FIG. 7 is a graph illustrating the performance of an exemplary channel estimator having extended filters in accordance with various exemplary embodiments for speeds of around 3 km/h.

In the FIG. 7 performance results 700, SCE results are shown in trace 701 for relative speeds of around 3 km/h with traces 703, 705, and 707 showing performance for individual filters having bandwidths set at 350 Hz, 490 Hz, and 690 Hz respectively.

Figure 8:
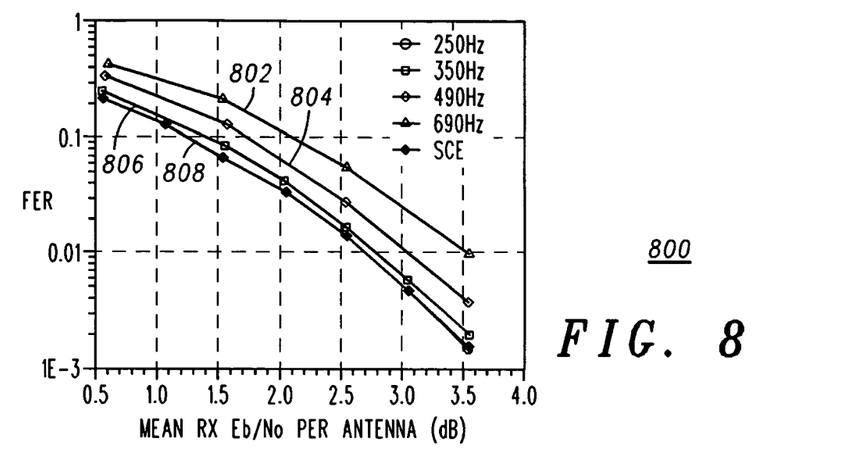
FIG. 8 is a graph illustrating the performance of an exemplary channel estimator having extended filters in accordance with various exemplary embodiments for speeds of around 120 km/h.

In the FIG. 8 performance results 800, SCE results are shown in trace 808 for relative speeds of around 120 km/h with traces 806, 804, and 802 showing performance for individual filters having bandwidths set at 350 Hz, 490 Hz, and 690 Hz respectively.

Figure 9:
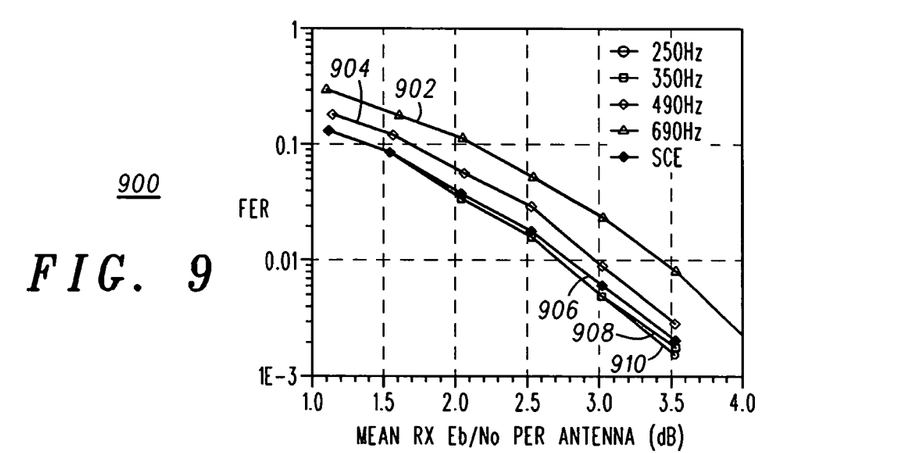
FIG. 9 is a graph illustrating the performance of an exemplary channel estimator having extended filters in accordance with various exemplary embodiments for speeds of around 150 km/h.

In the FIG. 9 performance results 900, SCE results are shown in trace 906 for relative speeds of around 150 km/h with traces 910, 908, 904, and 902 showing performance for individual filters having bandwidths set at 250 Hz, 350 Hz, 490 Hz, and 690 Hz respectively.

Figure 10:
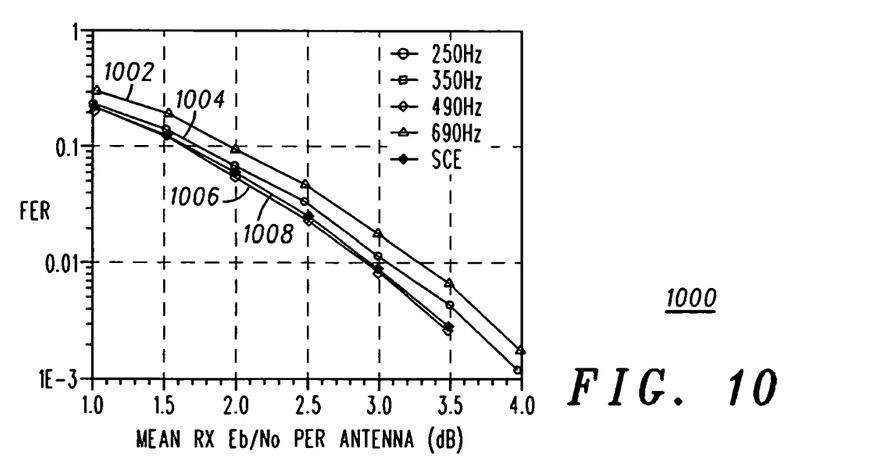
FIG. 10 is a graph illustrating the performance of an exemplary channel estimator having extended filters in accordance with various exemplary embodiments for speeds of around 220 km/h.

In the FIG. 10 performance results 1000, SCE results are shown in trace 1008 for relative speeds of around 220 km/h with traces 1004, 1006, and 1002 showing performance for individual filters having bandwidths set at 250 Hz, 490 Hz, and 690 Hz respectively.

Figure 11:
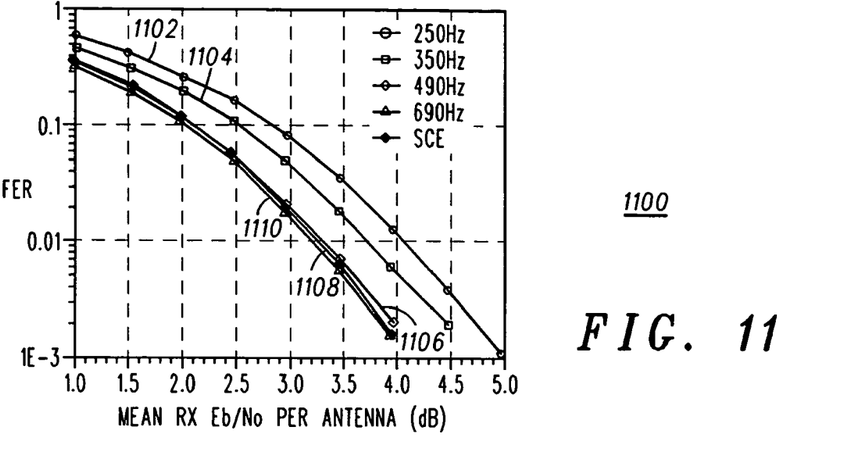
FIG. 11 is a graph illustrating the performance of an exemplary channel estimator having extended filters in accordance with various exemplary embodiments for speeds of around 320 km/h.

In the FIG. 11 performance results 1100, SCE results are shown in trace 1108 for relative speeds of around 320 km/h with traces 1102, 1104, 1106, and 1110 showing performance for individual filters having bandwidths set at 250 Hz, 350 Hz, 490 Hz, and 690 Hz respectively.

Figure 12:
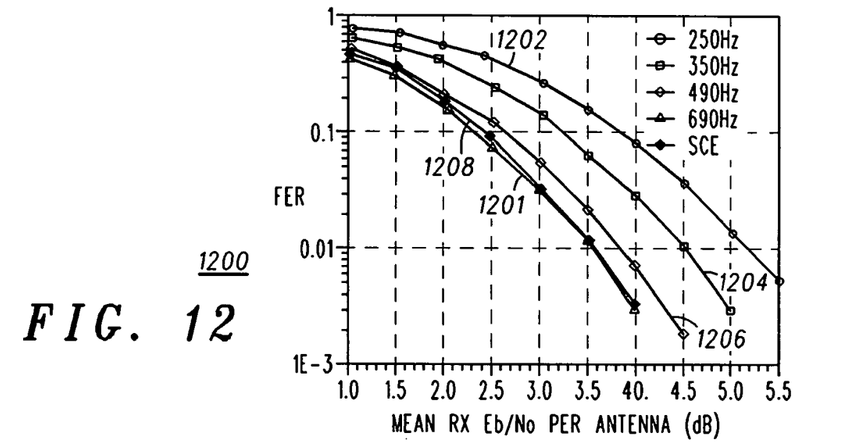
FIG. 12 is a graph illustrating the performance of an exemplary channel estimator having extended filters in accordance with various exemplary embodiments for speeds of around 400 km/h.

In the FIG. 12 performance results 1200, SCE results are shown in trace 1208 for speeds of around 400 km/h with traces 1202, 1204, 1206, and 1201 showing performance for individual filters having bandwidths set at 250 Hz, 350 Hz, 490 Hz, and 690 Hz respectively.

Figure 13:
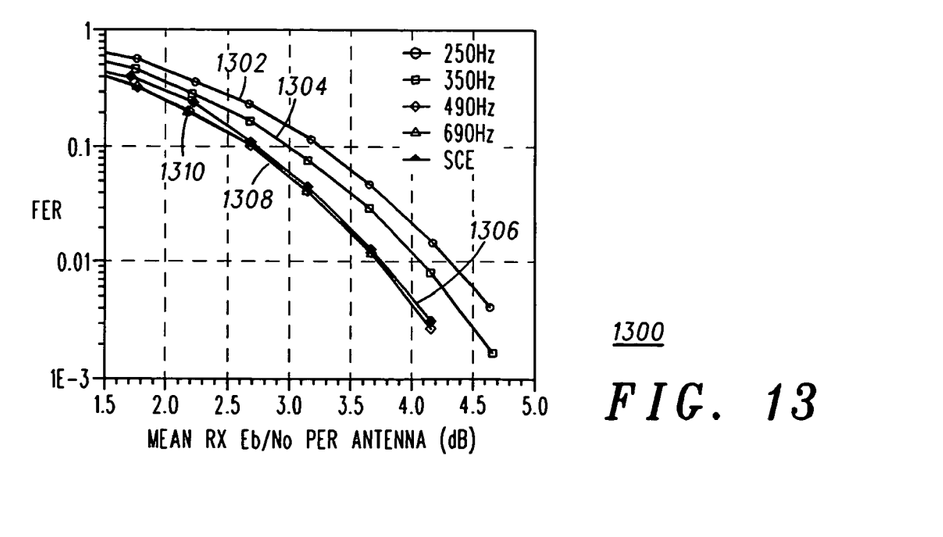
FIG. 13 is a graph illustrating the performance of an exemplary channel estimator having extended filters in accordance with various exemplary embodiments for speeds of around 320 two ray km/h.

In the FIG. 13 performance results 1300, SCE results are shown in trace 1306 for speeds of around 320 km/h and two ray multipath, with traces 1302, 1304, 1308, and 1310 showing performance for individual filters having bandwidths set at 250 Hz, 350 Hz, 490 Hz, and 690 Hz respectively.

Figure 14:
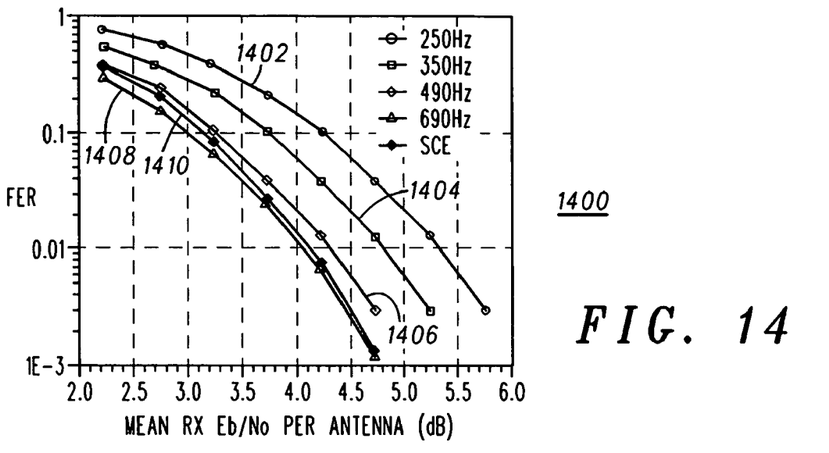
FIG. 14 is a graph illustrating the performance of an exemplary channel estimator having extended filters in accordance with various exemplary embodiments for speeds of around 400 two rays km/h.

In FIG. 14, SCE results are shown in trace 1410 for speeds of around 400 km/h and two ray multipath with traces 1402, 1404, 1406, and 1408 showing performance for individual filters having bandwidths set at 250 Hz, 350 Hz, 490 Hz, and 690 Hz respectively.

Figure 15:
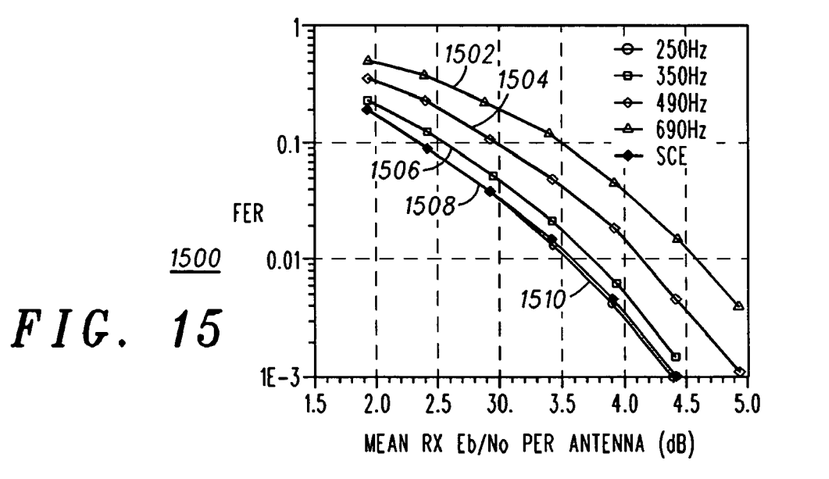
FIG. 15 is a graph illustrating the performance of an exemplary channel estimator having extended filters in accordance with various exemplary embodiments for speeds of around 120 km/h four rays.

In FIG. 15, SCE results are shown in trace 1508 for speeds of around 120 km/h and four ray multipath with traces 1502, 1504, 1506, and 1510 showing performance for individual filters having bandwidths set at 250 Hz, 350 Hz, 490 Hz, and 690 Hz respectively.

Figure 16:
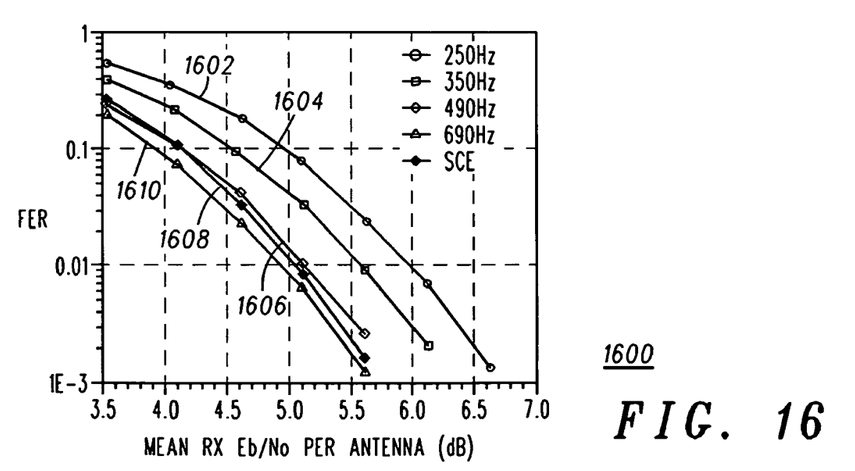
FIG. 16 is a graph illustrating the performance of an exemplary channel estimator having extended filters in accordance with various exemplary embodiments for speeds of around 400 km/h four rays.

In FIG. 16, SCE results are shown in trace 1608 for speeds of around 400 km/h and four ray multipath with traces 1602, 1604, 1606, and 1610 showing performance for individual filters having bandwidths set at 250 Hz, 350 Hz, 490 Hz, and 690 Hz respectively.

Figure 17:
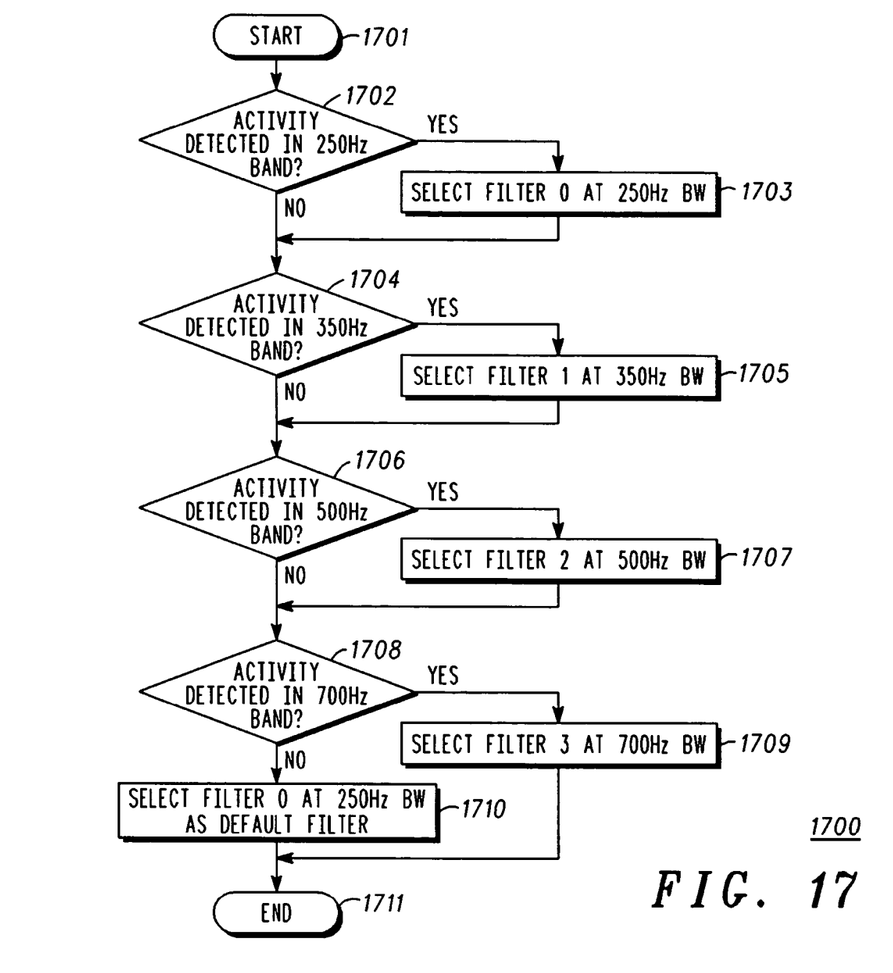
FIG. 17 is a flow chart illustrating exemplary procedure in accordance with various exemplary embodiments.

To better understand the operation of the present invention in accordance with various exemplary embodiments, an exemplary procedure 1700 is shown in FIG. 17. After start at 1701, it can be determined if signal activity is detected in the 250 Hz band at 1702. If activity is detected, then the FILTER 0 corresponding, for example, to the 250 Hz band can be selected for operation at 1703 in accordance with the description provided above. If activity is not detected, then it can be determined if signal activity is detected in the 350 Hz band at 1704. If activity is detected, then the FILTER 1 corresponding, for example, to the 350 Hz band can be selected for operation at 1705 in accordance with the description provided above. It should be noted that if FILTER 0 was selected based on the detection of activity in the 250 Hz band and activity is also detected in the 350 Hz band, FILTER 1 can be selected to supercede the selection of FILTER 0. If activity is not detected in the 350 Hz band, then it can be determined if signal activity is detected in the 500 Hz band at 1706. If activity is detected, then the FILTER 2 corresponding, for example, to the 500 Hz band can be selected for operation at 1707 in accordance with the description provided above. It should be noted that if FILTER 1 or FILTER 0, were selected based on the detection of activity in the 250 Hz or 350 Hz band and activity is also detected in the 500 Hz band, FILTER 2 can be selected to supercede the selection of FILTER 1 or FILTER 0. If activity is not detected in the 500 Hz band, then it can be determined if signal activity is detected in the 700 Hz band at 1708. If activity is detected, then the FILTER 3 corresponding to the 700 Hz band can be selected for operation at 1709 in accordance with the description provided above. It should be noted that if FILTER 0, FILTER 1, or FILTER 2 were selected based on the detection of activity in the 250 Hz, 350 Hz, or 500 Hz band and activity is also detected in the 700 Hz band, FILTER 3 can be selected to supercede the selection of FILTER 0, FILTER 1, or FILTER 2. If activity is not detected in the 700 Hz band then no detection has occurred in any band and FILTER 0 at 250 Hz can be selected for operation as the default filter at 1710 in accordance with the description provided hereinabove.

Figure 18:
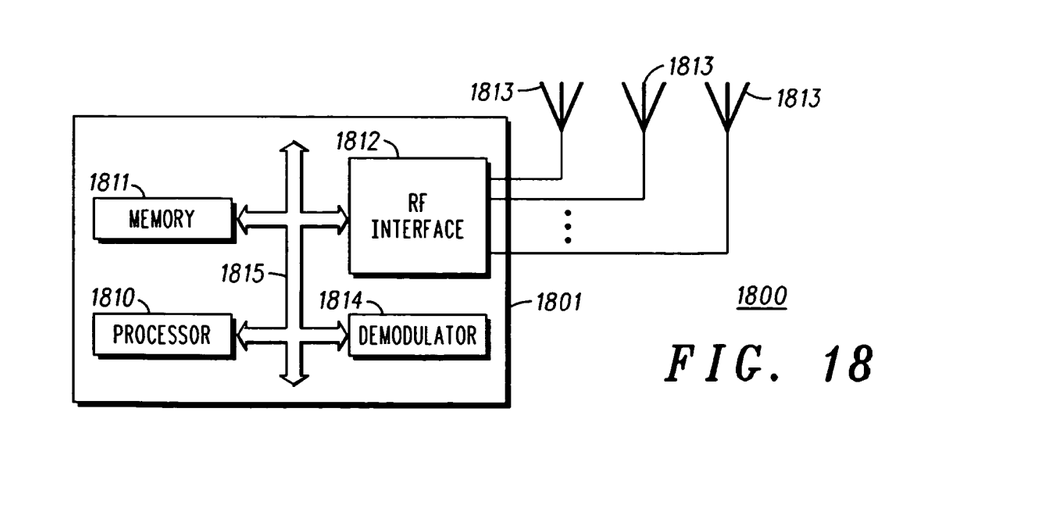
FIG. 18 is a block diagram illustrating components of an exemplary apparatus in accordance with various exemplary and alternative exemplary embodiments.

Further in accordance with various exemplary embodiments, an exemplary apparatus 1800 is shown in FIG. 18. A channel estimator such as channel estimator 1801, can consist of a processor 1810 and a memory 1811. It will be appreciated that processor 1810 can be a high performance general purpose processor, a digital signal processor, a dedicated processor, an Application Specific Integrated Circuit (ASIC) or the like as described, for example, hereinabove depending on the particular application or implementation of the receiver or transceiver. For example if channel estimator 1801 is implemented in a base station transceiver, processor 1810 might be more likely to be a high performance general purpose processor performing additional functions other than channel estimation, although processor 1810 could also be a dedicated processor in, for example, a "front end" portion of the base station transceiver. If channel estimator 1801 is implemented in a mobile station such as a handset, then it might be more likely to be a dedicated or special purpose processor integrated into the receive section electronics of the mobile station, although processor 1810 could also be a high performance general purpose processor which performs additional functions other than channel estimation in a mobile station with highly integrated electronics.

Whatever the particular implementation, processor 1810 can be configured to operate in connection with for example, a RF interface 1812 coupled to at least one antenna 1813 and possibly many antennas 1813 for receiving the incoming signal such as the CDMA pilot signal. It will be appreciated that in accordance with various alternative exemplary embodiments, certain portions of the channel estimator as described herein above such as, for example, the exemplary detectors, may be implemented in RF Interface 1812 where signal energy can be detected and so indicated to processor 1810. However RF Interface 1812 can provide signal samples to processor 1810 in a manner well known in the art whereupon digital methods such as the correlation methods and the like as described hereinabove can be used in processor 1810 to "detect" the presence of signal energy components in the desired frequency bands. As also described hereinabove, various signal processing procedures can be conducted on the pilot signals, and the like associated with the exemplary channel estimator such as filters associated with various bandwidths as described above. When the procedures have been performed the signal information on the estimated channel can be passed to an exemplary demodulator 1814 where further processing can be conducted.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing an estimation of a channel in a receiver associated with one or more of a mobile station and a base station in a Radio Access Network (RAN), the receiver capable of moving relative to a source of a signal in accordance with a relative speed, the method comprising:

detecting, by the receiver, the signal within one of a plurality of frequency bandwidths associated with a corresponding plurality of filters to provide a detected one of the plurality of frequency bandwidths and wherein the detecting includes coherently accumulating a difference signal generated from at least two outputs of at least two of the plurality of filters, estimating a noise variance associated with the signal and generating a positive detection result based on coherently accumulating the difference signal, estimating the noise variance, and a detection threshold; and selecting, by the receiver, one of the plurality of filters for providing the estimation based on the detected one of the plurality of frequency bandwidths, wherein if the signal detection fails to provide the detected one of the plurality of frequency bandwidths, the selecting step selects a default one of the plurality of filters for the providing the estimation.

2. A method in accordance with claim 1, wherein the detecting further includes repeating coherently accumulating the difference signal, estimating the noise variance, and generating the positive detection result for each of the plurality of frequency bandwidths.

3. A method in accordance with claim 1, wherein the RAN includes a Code Division Multiple Access RAN and the signal includes a pilot signal.

4. A method in accordance with claim 1, wherein the plurality of frequency bandwidths substantially include 250 Hz, 350 Hz, 500 Hz, and 700 Hz.

5. A method in accordance with claim 1, wherein the relative speed includes speeds of from around 120 km/h to around 500 km/h.

6. An apparatus for providing an estimation of a channel in a receiver associated with one or more of a mobile station and a base station in a Radio Access Network (RAN), the receiver capable of moving relative to a source of a signal in accordance with a relative speed, the apparatus comprising:

a memory;

an RF interface arranged to couple to the RAN and configured to receive the signal; and a processor coupled to the memory and the RF interface, the processor configured to facilitate:

detecting the signal received from the RF interface within an associated frequency bandwidth to form a detected signal and wherein the detecting includes generating a difference signal between at least two outputs associated with at least two of the plurality of filters, coherently accumulating the difference signal during a time interval, estimating a noise variance during the time interval associated with the signal and generating a positive detection result based on coherently accumulating the difference signal, estimating the noise variance, and a detection threshold; and selecting one of a plurality of filters configured in the processor for providing the estimation based on the detected signal, wherein if the detecting fails to detect the signal within the associated frequency bandwidth, the selecting selects a default one of the plurality of filters for the providing the estimation.

7. An apparatus in accordance with claim 6, wherein the RAN includes a Code Division Multiple Access RAN and the signal includes a pilot signal.

8. An apparatus in accordance with claim 6, wherein the plurality of frequency bandwidths substantially include 250 Hz, 350 Hz, 500 Hz, and 700 Hz.

9. An apparatus in accordance with claim 6, wherein the relative speed includes speeds of from around 120 km/h to around 500 km/h.

10. A method for providing an estimation of a channel in a receiver associated with one or more of a mobile station and a base station in a Radio Access Network (RAN), the receiver capable of moving relative to a source of a signal in accordance with a relative speed, the method comprising:

detecting, by the receiver, the signal within one of a plurality of frequency bandwidths associated with a corresponding plurality of filters to provide a detected one of the plurality of frequency bandwidths and wherein the detecting includes generating a difference signal between at least two outputs associated with at least two of the plurality of filters, coherently accumulating a plurality of inputs during a time interval, estimating a noise variance during the time interval associated with the signal and generating a positive detection result based on coherently accumulating the difference signal, estimating the noise variance, and a detection threshold; and selecting, by the receiver, one of the plurality of filters for providing the estimation based on the detected one of the plurality of frequency bandwidths, wherein if the signal detection fails to provide the detected one of the plurality of frequency bandwidths, the selecting step selects a default one of the plurality of filters for the providing the estimation.

11. A method in accordance with claim 10, further comprising delaying a signal from the plurality of filters.

12. A method in accordance with claim 1, further comprising delaying a signal form the plurality of filters.

* * * * *